(12) United States Patent
Kendall

(10) Patent No.: US 8,191,954 B2
(45) Date of Patent: Jun. 5, 2012

(54) MOTORCYCLE WINDSHIELD TRIM

(76) Inventor: James Kendall, Burlington, WI (US)

(*) Notice: Subject to any disclaimer, the term of this patent is extended or adjusted under 35 U.S.C. 154(b) by 412 days.

(21) Appl. No.: 12/617,824

(22) Filed: Nov. 13, 2009

(65) Prior Publication Data

US 2010/0117392 A1 May 13, 2010

Related U.S. Application Data

(60) Provisional application No. 61/114,341, filed on Nov. 13, 2008.

(51) Int. Cl.
*B60J 1/00* (2006.01)
(52) U.S. Cl. .................. 296/84.1; 296/37.1; 224/413
(58) Field of Classification Search .............. 296/37.1, 296/77.1, 78.1, 84.1, 91, 180.1; 224/413
See application file for complete search history.

(56) References Cited

U.S. PATENT DOCUMENTS

| | | | | |
|---|---|---|---|---|
| 5,881,936 A | * | 3/1999 | Li | .................. 224/413 |
| 6,647,121 B2 | * | 11/2003 | Stanberry et al. | ............... 381/86 |
| 6,808,096 B1 | * | 10/2004 | Salasny, Sr. | .................. 224/413 |
| D521,417 S | | 5/2006 | Stahel et al. | |
| D575,199 S | | 8/2008 | Stahel, Jr. et al. | |
| D575,200 S | | 8/2008 | Stahel | |
| D599,711 S | | 9/2009 | Kendall | |
| D615,021 S | * | 5/2010 | Lovett | .................. D12/409 |
| 2002/0131606 A1 | * | 9/2002 | Stanberry et al. | ............... 381/86 |

* cited by examiner

*Primary Examiner* — Lori Lyjak
(74) *Attorney, Agent, or Firm* — Jansson Shupe & Munger Ltd.

(57) ABSTRACT

A trim for a motorcycle windshield having windshield-adjacent storage compartments along the lower windshield edge. The trim includes a body with a shield portion and a mounting portion of rigid sheet material sufficiently flexible to conform to the windshield surface. The shield portion has a length for spanning the full width of the windshield lower edge and a vertical dimension sufficient to reach to a level along the tops of the windshield-adjacent storage compartments. The mounting portion extends below the shield portion to engage existing windshield-mounting hardware for securement of the trim to the motorcycle. The trim is secured to the motorcycle windshield by loosening the existing windshield-mounting hardware from a fairing at the windshield and pulling the top of the fairing away from the windshield. The mounting portion is then slid between the fairing and the windshield along the lower windshield edge, adjusted to the desired position, and the hardware is tightened to sandwich the trim between the fairing and the windshield.

15 Claims, 2 Drawing Sheets

MOTORCYCLE WINDSHIELD TRIM

RELATED APPLICATION

This application claims the benefit of U.S. Provisional No. 61/114,341, filed Nov. 13, 2008, the entire contents of which are incorporated herein by reference.

FIELD OF THE INVENTION

The invention relates to motorcycle accessories.

BACKGROUND OF THE INVENTION

Motorcycle owners are generally very attentive to and proud of the appearance of their motorcycles in every regard. However, wear and use of a motorcycle present a number of problems with respect to keeping a motorcycle looking clean and well-kept.

There is also an issue of storage space accessible to a motorcyclist while operating his or her motorcycle. An area between the control panel and windshield is one of the few spaces available for positioning storage compartments for certain items which a motorcyclist needs within easy reach. For that purpose leather bags are often positioned against the windshield above the control panel. While providing convenient storage, such leather bags tend to rub the driver's side of the windshield which causes unsightly surface damage to the windshield. In addition, the leather bags or any other types of windshield-adjacent storage creates many small spaces in which various little particles, such as dirt and bugs get caught. These little spaces, while visible through the windshield, are very hard to reach for cleaning.

All of this results in an unpleasant appearance of the motorcycle despite the owner's cleaning efforts. Thus, there is a need for a solution which would facilitate motorcycle maintenance and reduce visible degradation of the windshield area.

OBJECTS OF THE INVENTION

It is an object of this invention to provide an improvement in appearance of a motorcycle windshield area.

Another object of this invention is to minimize visibility of degradation in areas along the bottom of the windshield.

Yet another object of this invention is to provide an esthetically-pleasing appearance of the lower area of the motorcycle windshield.

Still another object of this invention is to achieve the above objects with a minimum tool usage and alterations of the motorcycle.

SUMMARY OF THE INVENTION

The invention is a cover-up trim for a motorcycle windshield with windshield-adjacent storage compartments such as leather bags along the lower windshield edge. The inventive trim serves to cover unsightly damage caused by windshield bags rubbing on the inside of the windshield and to cover hard-to-clean dirtied areas between the windshield and the windshield bags. It also serves as an attractive decorative piece for similar motorcycle models without windshield bags.

The inventive trim device is made of a rigid sheet material which is sufficiently flexible to conform to the shape of a windshield surface. The inventive device is configured to be easily secured to the outside of the windshield with proper adherence to the windshield shape.

The cover-up trim device has a shield portion and a mounting portion. The shield portion is configured to be visible and to cover typically unsightly areas of the windshield. The shield portion has a length which substantially spans the full width of a windshield bottom and a vertical dimension which is sufficient to reach to a level substantially along the tops of the windshield-adjacent storage compartments. The shield portion preferably extends upwardly for a distance based on the typical height of windshield-adjacent storage compartments, or generally has a vertical dimension which is sufficient to cover the windshield area of concern. In some preferred embodiments, the visible vertical dimension of the device (from the front) is as little as 3.25 inches.

The mounting portion extends below the shield portion of the cover-up trim, i.e., the mounting portion is not visually exposed from the front when the device is in its mounted position because the mounting portion is sandwiched between a fairing and the windshield along the lower windshield edge by existing windshield-mounting hardware. The mounting portion is configured to engage existing windshield-mounting hardware to facilitate the trim securement to the motorcycle. Such configuration is based on existing hardware of a particular motorcycle model and may vary between different models. Examples of motorcycle models include Harley Davidson models of 1996 and newer FLHT series & FLHX. In one embodiment, the mounting portion includes three spaced recesses, preferably including two side recesses and one center recess. Each recess corresponds to the position of a respective stock screw secured to the fairing near the bottom of the windshield. Each recess preferably has an inner cross-dimension greater than its opening cross-dimension, which facilitates proper mounting.

To install the inventive trim, the existing windshield-mounting hardware, such as stock screws, is removed from the fairing at the windshield. Then the top of the fairing is gently pulled away from the windshield. While holding the trim device with the thumb and index fingers approximately at midpoints of left and right edges, the installer slides the inventive device down between the front of the windshield and the fairing. After the device is adjusted at left and right sides to the desired height, the screws are reinserted and tightened to secure the trim on the windshield. The inventive trim can be easily installed in minutes on the outside of the windshield by using the existing motorcycle hardware on the fairing.

Another important aspect of this invention is that it is preferably made from a high quality steel, polished to a flawless finish and triple chrome plated. This greatly enhances the look of the motorcycle. It should however be noted that, while such polished chrome finish is highly desirable, the inventive cover-up trim may have other colors, including polished colored chrome, various matte finishes, and special customized art work such as etching.

The term "rigid sheet material which is sufficiently flexible to conform to the windshield surface" means that such material is firm enough to retain its own form even apart from its mounting position against the windshield surface (i.e., it is not limp), but still allows for flexing/bending along the length of the trim into curvature that conforms to the shape of the windshield surface.

DETAILED DESCRIPTION OF PREFERRED EMBODIMENTS

Figure 1:
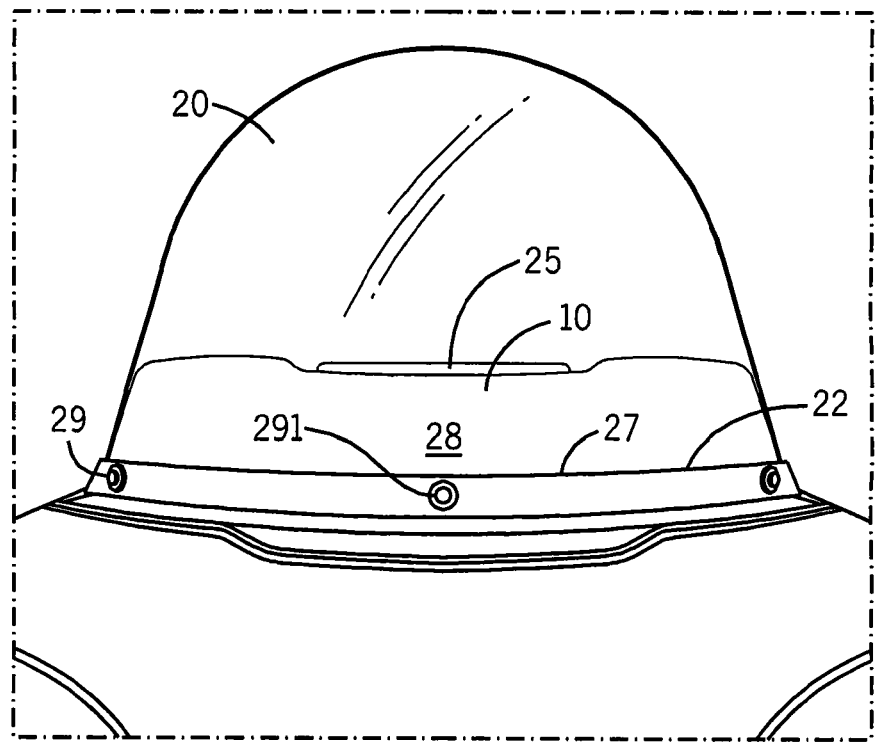
FIG. 1 is a front perspective view of the inventive trim device mounted on a motorcycle.
Figure 2:
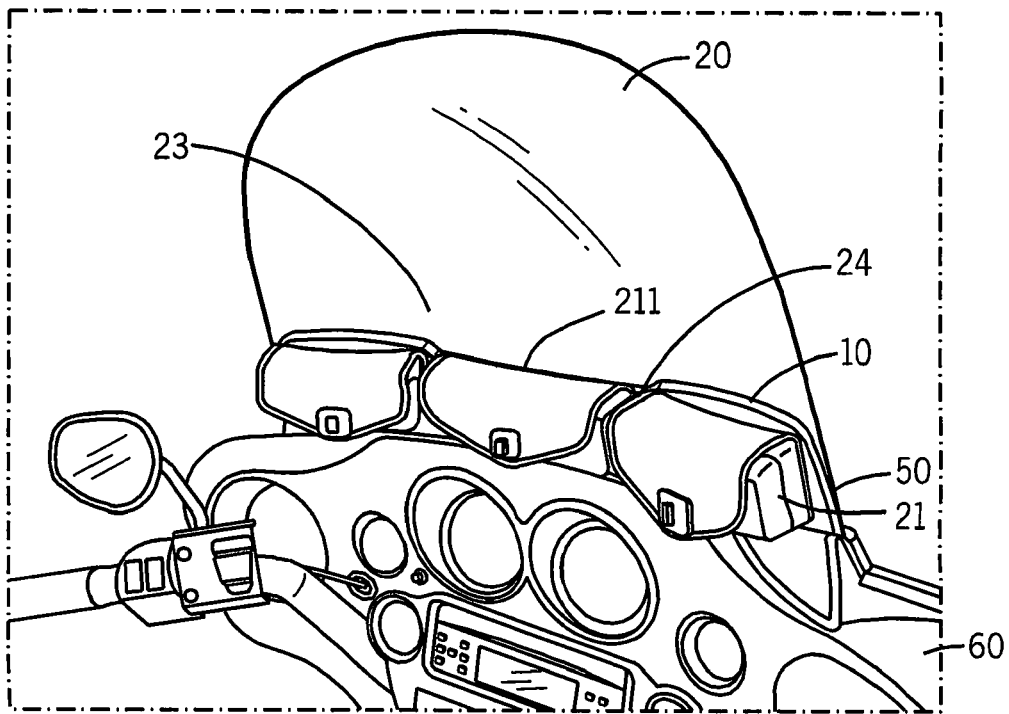
FIG. 2 is a back perspective view of the mounted trim device as in FIG. 1.

The invention is a cover-up trim 10 for a motorcycle windshield 20 with windshield-adjacent storage compartments 21 such as leather bags along the lower windshield edge 22. The inventive trim 10 serves to cover unsightly damage caused by windshield bags 21 rubbing on an inside 23 of windshield 20 and to cover hard-to-clean dirtied areas 24 between windshield 20 and windshield bags 21. It also serves as an attractive decorative piece for similar motorcycle models without windshield bags.

Inventive trim device 10 is made of a rigid sheet material which is sufficiently flexible to conform to the shape of an outside windshield surface 25. Inventive device 10 is configured to be easily secured to outside 25 of windshield 20 with proper adherence to the windshield shape.

Cover-up trim device 10, as shown in FIGS. 1-4, has shield and mounting portions 30 and 40. Shield portion 30 is configured to be visible and to cover typically unsightly areas 24 of windshield 20. Shield portion 30 has a length 31 which substantially spans a full width of a windshield bottom 27. Shield portion 30 also has a vertical dimension 32 which is sufficient to reach to a level substantially along tops 211 of windshield-adjacent storage compartments 21. Shield portion 30 extends upwardly for a distance based on the typical height of windshield-adjacent storage compartments 21, or generally has vertical dimension 32 which is sufficient to cover windshield area 24 of concern. Visible vertical dimension of the device (from the front) may be as little as 3.25 inches.

Figure 3:
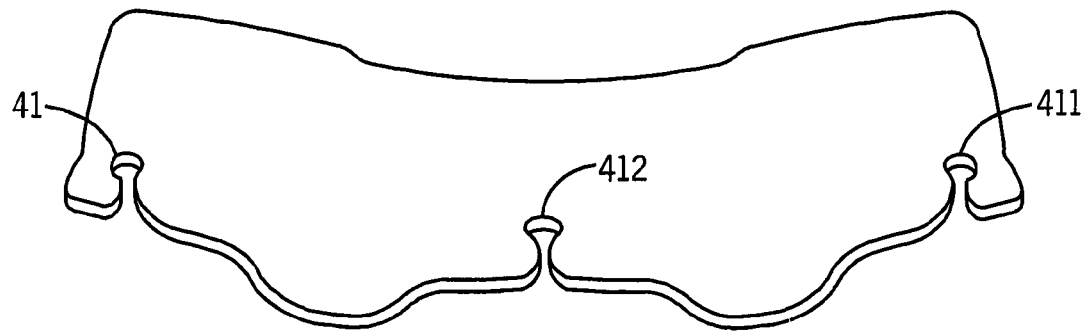
FIG. 3 a front perspective view of the inventive trim device unmounted.
Figure 4:
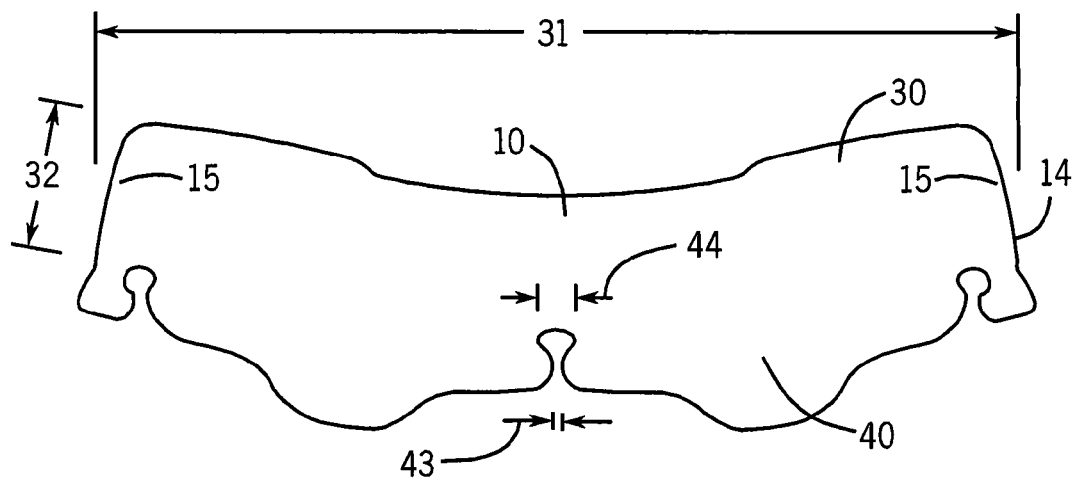
FIG. 4 a front elevation of the inventive trim device.

Mounting portion 40 extends below shield portion 30 of the cover-up trim 10, i.e., mounting portion 40 is not visually exposed from front 28 when device 10 is in its mounted position because mounting portion 40 is sandwiched between a fairing 50 and windshield 20 along lower windshield edge 22 by existing windshield-mounting hardware 29. Mounting portion 40 is configured to engage existing windshield-mounting hardware 29 to facilitate trim securement to motorcycle 60 adjacent to windshield 20. Such configuration is based on existing hardware 29 of a particular motorcycle model and may vary between different models. Examples of motorcycle models include Harley Davidson models of 1996 and newer FLHT series & FLHX. As best seen in FIGS. 3 and 4, mounting portion 40 includes three spaced recesses 41, including two side recesses 411 and one center recess 412. Each recess 41 corresponds to the position of a respective stock screw 291 secured to fairing 50 near bottom 27 of windshield 20. Each recess 41 has an inner cross-dimension 43 greater than its opening cross-dimension 44, which facilitates proper mounting. To install inventive trim 10, stock screws 291 are removed from fairing 50 at windshield 20. Then a top of fairing 50 is gently pulled away from windshield 20. While holding trim device 10 with thumb and index fingers approximately at midpoints 15 of left and right edges 14, the installer slides inventive device 10 down between front 28 of windshield 20 and fairing 50. After device 10 is adjusted at left and right sides 14 to the desired height, screws 291 are reinserted and tightened to secure trim 10 on windshield 20. Inventive trim 10 can be easily installed in minutes on outside 25 of windshield 20 by using existing motorcycle hardware 29 on fairing 50.

Another important aspect of this invention is that trim 10 is preferably made from a high quality steel, polished to a flawless finish and triple chrome plated. This greatly enhances the look of motorcycle 60. It should however be noted that, while such polished chrome finish is highly desirable, the inventive cover-up trim may have other colors, including polished colored chrome, various matte finishes, and special customized art work such as etching.

While the principles of the invention have been shown and described in connection with specific embodiments, it is to be understood that such embodiments are by way of example and are not limiting.

The invention claimed is:

1. A trim for a motorcycle windshield having windshield-adjacent storage compartments along the lower windshield edge, the trim comprising a body of rigid sheet material which is sufficiently flexible to conform to the windshield surface, the body including: a shield portion having (a) a length for substantially spanning the full width of the lower edge of the windshield and (b) a vertical dimension sufficient to reach to a level substantially along the tops of the windshield-adjacent storage compartments; and a mounting portion extending below the shield portion and configured to engage existing windshield-mounting hardware to facilitate securement to the motorcycle adjacent to the windshield.

2. The device of claim 1 wherein the vertical dimension of the shield portion, which is visible above the fairing from the front, is about 3.25 inches.

3. The device of claim 1 wherein the mounting portion has a bottom edge defining three spaced recesses, each corresponding to the position of a respective windshield-mounting screw for securement to a fairing.

4. The device of claim 3 wherein each recess has an inner cross-dimension greater than its opening cross-dimension to facilitate proper mounting of the trim.

5. The device of claim 1 wherein the sheet material is polished steel with chrome plating.

6. A trim-and-windshield assembly on a motorcycle with windshield-adjacent storage compartments at the inside of the windshield along the lower windshield edge, the assembly comprising a trim of rigid sheet material which is sufficiently flexible to conform to the windshield surface, the trim including a shield portion having (a) a length substantially spanning the full width of the lower edge of the windshield and (b) a vertical dimension reaching to a level substantially along the tops of the windshield-adjacent storage compartments, and a mounting portion extending below the shield portion and sandwiched between a fairing and the windshield along the lower windshield edge by existing windshield-mounting hardware.

7. The device of claim 6 wherein the vertical dimension of the shield portion, which is visible above the fairing from the front, is about 3.25 inches.

8. The device of claim 6 wherein the mounting portion has a bottom edge defining three spaced recesses, each corresponding to the position of a respective windshield-mounting screw.

9. The device of claim 8 wherein each recess has an inner cross-dimension greater than its opening cross-dimension facilitating proper mounting of the trim.

10. The device of claim 6 wherein the sheet material is polished steel with chrome plating.

11. A method for installing a trim for a motorcycle windshield having windshield-adjacent storage compartments along the lower windshield edge, comprising:

providing a trim of rigid sheet material which is sufficiently flexible to conform to the windshield surface, the trim including a shield portion having (a) a length for substantially spanning the full width of the lower edge of the windshield and (b) a vertical dimension sufficient to reach to a level substantially along the tops of the windshield-adjacent storage compartments, and a mounting portion extending below the shield portion and configured to engage existing windshield-mounting hardware;

loosening the existing windshield-mounting hardware from a fairing at the windshield;

pulling the top of the fairing away from the windshield;

sliding the mounting portion between the fairing and the windshield along the lower windshield edge;

adjusting the trim to the desired position; and tightening the windshield-mounting hardware to sandwich the trim between the fairing and the windshield.

12. The method of claim 11 wherein the vertical dimension of the shield portion, which is visible above the fairing from the front, is about 3.25 inches.

13. The method of claim 12 wherein the mounting portion has a bottom edge defining three spaced recesses, each corresponding to the position of a respective windshield-mounting screw.

14. The method of claim 13 wherein each recess has an inner cross-dimension greater than its opening cross-dimension facilitating proper mounting of the trim.

15. The method of claim 11 wherein the sheet material is polished steel with chrome plating.

* * * * *